United States Patent Office 2,896,686
Patented July 28, 1959

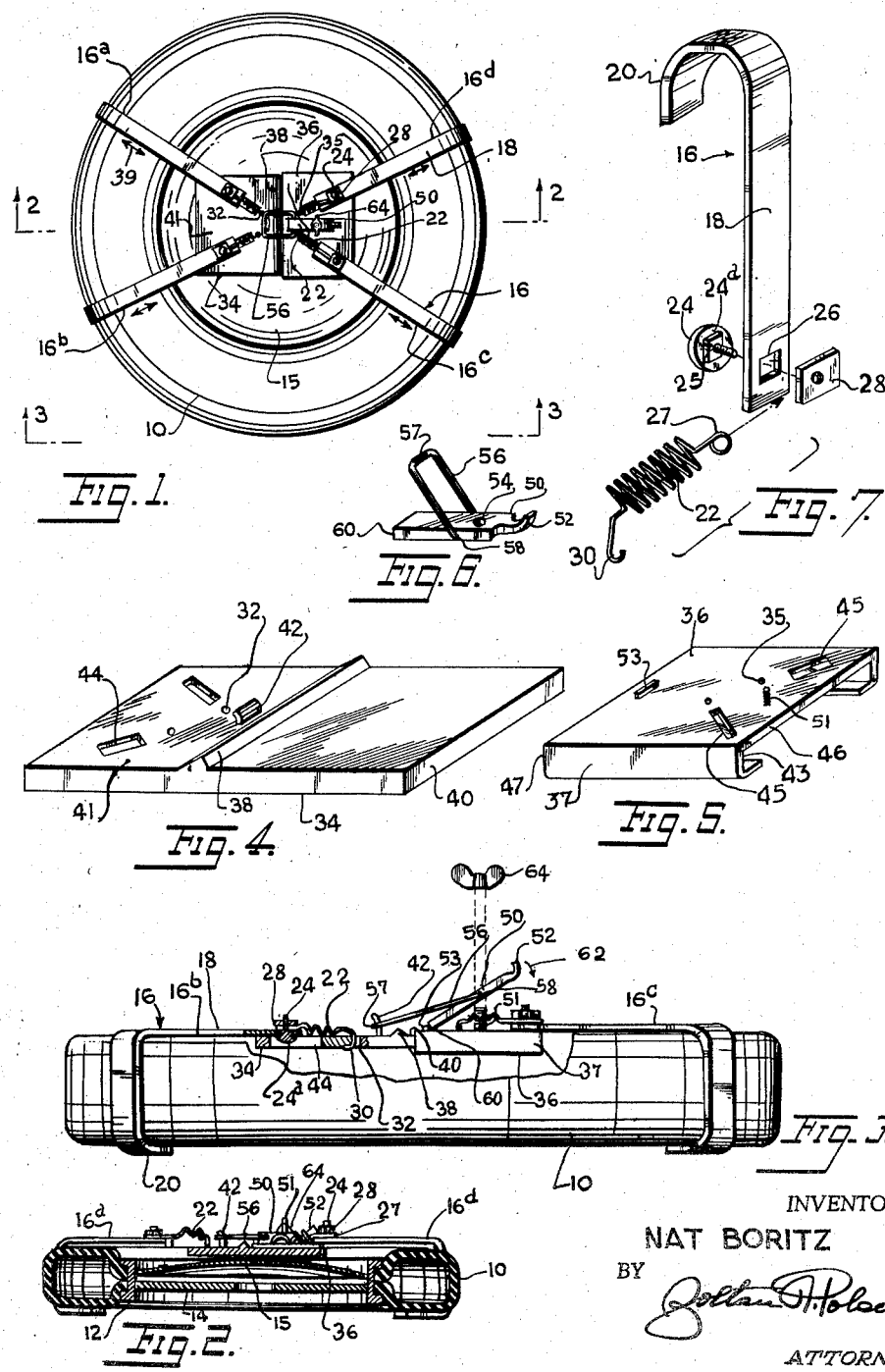

2,896,686

EMERGENCY TRACTION DEVICE FOR MOTOR VEHICLES

Nat Boritz, Merrick, N.Y.

Application June 6, 1958, Serial No. 740,324

5 Claims. (Cl. 152—225)

This invention relates to improvements in traction devices and particularly concerns a device adapted to be mounted upon a vehicle tire to prevent slipping of the tire as it travels over slippery, muddy, sandy or snow-covered surfaces or terrain.

Many types of anti-skid devices have been proposed for preventing wheels of a vehicle from skidding under unfavorable road conditions. Generally such devices cannot readily be attached to the vehicle wheels without considerable effort and often requiring the vehicle to be jacked up to accomplish the attachment. Particularly in recent years, automobile wheels are customarily enclosed to a greater extent than heretofore within fenders or overhanging portions of the automobile body so that mounting prior known anti-skid devices is quite difficult.

It is a principal object of the present invention to provide a device which can be easily applied to a vehicle wheel without the necessity of employing any tool and without jacking up the vehicle wheel.

It is a further object to provide a device having a plurality of angularly spaced spring-biased hook bars having a general J-shape which bars can be hooked over the peripheral surface of the tire of a wheel.

A further object is to provide a device of the character described with quick locking plate portions whereby the bars are securely locked under tension at the outer side of the vehicle wheel.

According to the invention the bars are preferably mounted on a wheel with the long arms of the bars extending substantially radially of the wheel along the outer surface thereof so that the shorter arms of the bars overlay the inner wheel surface. With this arrangement the bars may be hooked over the wheel from the exterior thereof and when properly located the locking means can be closed to secure the bars in proper angular relation and prevented from accidental removal. Each bar is arranged to reciprocate or slide longitudinally in order to absorb road shocks and accommodate the arms to irregularities in road and traction surfaces.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a device embodying the invention and mounted upon a vehicle wheel.

Fig. 2 is a sectional view taken on line 2—2 of Fig. 1.

Fig. 3 is a plan view on an enlarged scale taken on line 3—3 of Fig. 1 with portions of the wheel broken away to show details of the traction device, and with the locking means partially closed.

Fig. 4 is an enlarged perspective view of a main locking plate employed in the device.

Fig. 5 is a perspective view of a locking slide plate.

Fig. 6 is a perspective view of a locking bar.

Fig. 7 is an exploded perspective view of a J-shaped bar and associated parts employed in the device.

Referring to the drawings, there is shown in Figs. 1, 2 and 3, a traction device embodying the invention mounted upon a vehicle wheel. The wheel includes a tire 10, inner flange ring 12, axle plate 14 and a hub cap 15. While these parts do not form part of the invention, they are shown to illustrate more clearly the function and mode of operation of the device. Hook bars 16 are mounted upon the wheel. As shown clearly in Fig. 1, the bars have their longer arms 18 extending radially at the outer side of the wheel. The shorter arms 20 are disposed at the inner side of the wheel and securely embrace the tire. Four bars are provided. Bar 16ª is diametrally opposed to bar 16ᶜ and bar 16ᵇ is diametrally opposed to bar 16ᵈ. Adjacent bars 16ª, 16ᵇ and 16ᶜ, 16ᵈ are arranged in pairs. The bars in each pair are spaced angularly about 60°.

The bars are tensioned by coil springs 22 which are attached at one end near the free ends of the bars. The attachment means includes a short carriage bolt 24 which has a square shank portion 25 adapted to engage in a square hole 26 in the arm 18, as best shown in Fig. 7. Nut 28 threads on bolt 24 and engages therebetween the looped end 27 of the spring. The other end 30 of the spring is formed as a hook which engages in one of a pair of holes 32 on main plate 34 or one of holes 35 in slide plate 36.

The main and slide plates are best shown in Figs. 3, 4 and 5. Main plate 34 is generally rectangular and is formed with a centrally disposed transverse ridge 38 which provides an abutment for slide plate 36. Holes 32 are provided in the outer plate portion 41. Centrally disposed near ridge 38 is a curved upstanding hook 42. A pair of angularly disposed slots 44 are formed in plate portion 41 and similar angular slots 45 provided in plate 36. These slots receive the heads 24ª of bolts 24. The heads slide in the slots as the bars 16 move longitudinally as indicated by arrows 39 in Fig. 1, in response to road shocks and irregularities in the road or traction surface. The slots serve as guides for the ends of arms 18 during the locking of the bars on the wheel.

Plate 36 is intended to fit and slide on rectangular end plate portion 40 of plate 34. Plate 36 is rectangular and has depending sides 37 turned inwardly to define channels 43 in which fit the lateral ends of plate portion 40. A short threaded pin 51 is centrally located near end 46 of the plate. A small boss 53 near end 47 provides a pivot element for the lock bar 50 as best shown in Fig. 6. This bar is about equal in length to plate 36 and has an upwardly curved tongue 52 at one end. A hole 54 is provided in the bar. This hole has a diameter larger than that of pin 51 so that when bar 50 is pivoted on plate 36 at boss 53, as shown in Fig. 3, pin 51 will easily enter the hole in the bar. A metal wire loop 56 is pivotally mounted on bar 50. This rectangular U-shaped loop has inwardly extending ends engaged in holes 58 in the sides of the bar.

Normally, bars 16 will be attached by springs 22 to the separated plates 34 and 36. It will be apparent that bars 16ª and 16ᵇ can easily be hooked over the tire at one side and that bars 16ᶜ and 16ᵈ can be hooked over the other side of the tire without jacking up the wheel. When the bars are properly disposed angularly at the outer side of the wheel, slide plate 36 will be superimposed on plate 34 with plate portion 40 engaged in channels 43. The lock bar 50 will then be placed over plate 36 with the bight portion 57 of loop 56 engaged on hook 42 in the position shown in Fig. 3. The end 60 of bar 50 will be pivoted against boss 53 as a fulcrum and the bar 50 will be lowered as indicated by arrow 62 to engage pin 51 in hole 54. A wing nut 64 may then be manually threaded on pin 51 to secure the bar 50 in place. Bar 50 will serve as a locking lever to draw the plate 36 up to ridge 38 and then nut 64 will complete the locking operation. Thus, the bars 16 will be securely engaged on the tire under spring tension. The bars will be releasable by unscrewing nut 64 and raising bar 50 whereupon the tension in the springs 22 will be released as plate 36 draws away from ridge 38. The upwardly curved tongue 52 provides a means for prying up bar 50 to release it from pin 51. The length of the arms of loop 56 should be such that a tension exists in the loop when the bar 50 is closed. The loop will be made of flexible spring wire metal. The loop will flex slightly at the bight 57 engaged on hook 42 so that the bar 50 is opened and closed with a snapping detent action. During the locking of the bars springs 22 are tensioned while the bolt heads 24ª slide in slots 44 and 45 of the plates. During rotation of the wheel on a roadway, the bars can reciprocate longitudinally to accommodate the bars to irregularities in the roadway and to absorb road shocks.

It will be noted that no tools are required to mount and demount the traction device disclosed. When in place it effectively serves as an anti-skid device on roads having slippery conditions caused by mud, snow, sand, and the like. The device is rugged in structure. Parts can easily be replaced if desired. The device is simple to operate. It is inexpensive to manufacture by well-known metal forming processes suitable for the several parts. The several parts can be made of steel or such other metals and materials as desired.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A traction device for a wheel and tire, comprising a main rectangular plate, a rectangular slide plate adapted to slide on a portion of the main plate, a pair of J-shaped traction bars secured by spring means to each of the plates, and locking means removably securing the slide plate to the main plate, said locking means tensioning said spring means when the bars are angularly disposed on diametrally opposed sides of said tire, said locking means comprising a lever having a spring wire U-shaped loop pivotally attached thereto, a hook on the main plate for engaging the bight of said loop under spring tension, a threaded pin carried by the slide plate for entering an aperture in said lever, and a wing nut for securing the lever to the slide plate.

2. A traction device for a wheel and tire, comprising a main rectangular plate, a rectangular slide plate adapted to slide on a portion of the main plate, a pair of J-shaped traction bars secured by spring means to each of the plates, and locking means removably securing the slide plate to the main plate, said locking means tensioning said spring means when the bars are angularly disposed on diametrally opposed sides of said tire, said locking means comprising a lever having a spring wire U-shaped loop pivotally attached thereto, a hook on the main plate for engaging the bight of said loop under spring tension, a threaded pin carried by the slide plate for entering an aperture in said lever, and a wing nut for securing the lever to the slide plate, said spring means being coil springs secured by carriage bolts to the traction bars, said plates having slots formed to receive portions of said carriage bolts to guide said bars in longitudinal movement on the plates.

3. A traction device for a wheel and tire comprising a main plate, a channeled slide plate adapted to slide over a portion of the main plate, a hook element on the main plate, a locking lever having a pivotable loop adapted to engage on said hook element, a pivot element on the slide plate for pivoting said lever thereon, means for locking the lever on the slide plate with the loop engaged on the hook element, J-shaped bars having long and short arms adapted to overlay opposite sides of the tire, and coil springs each having one end secured to one end of a long arm of one of said bars, the other end of each spring being engaged in an aperture in one of the plates, said main plate and slide plate each having angularly disposed slots for guiding the bars in longitudinal movement during actuation of said lever and during rotation of said wheel over irregularities in a roadway.

4. A traction device for a wheel and tire comprising a main plate having a transverse ridge, a slide plate adapted to slide over a portion of the main plate up to said ridge, a hook element on the main plate, a locking lever having a pivotable loop adapted to engage on said hook element, a pivot element on the slide plate for pivoting said lever thereon, means for locking the lever on the slide plate with the loop engaged on the hook element, J-shaped bars having long and short arms adapted to overlay opposite sides of the tire, and coil springs each having one end secured by a bolt to one end of a long arm of one of said bars, the other end of each spring being engaged in an aperture in one of the plates, said main plate and slide plate each having angularly disposed slots receiving heads of said bolts so that the long arms of the bars lay flush on the plates and are guided in longitudinal movement thereon, said means comprising a threaded pin secured on the slide plate, said locking lever having an aperture for receiving said pin, and a wing nut removably engaged on said pin.

5. A traction device for a wheel and tire comprising a main plate, a slide plate having depending sides forming channels for receiving slidably a portion of the main plate, a hook element on the main plate, a locking lever having a pivotable loop adapted to engage on said hook element, a pivot element on the slide plate for pivoting said lever thereon, means for locking the lever on the slide plate with the loop engaged on the hook element, J-shaped bars having long and short arms adapted to overlay opposite sides of the tire, and coil springs each having one end secured by a carriage bolt to one end of a long arm of one of said bars, the other end of each spring being engaged in an aperture in one of the plates, said main plate and slide plate each having angularly disposed slots for receiving heads of said bolts so that the long arms of the bars lay flush on the plates and are guided in longitudinal movement thereon, said means comprising a threaded pin secured on the slide plate, said locking lever having an aperture for receiving said pin, and a wing nut removably engaged on said pin, said locking lever having a curved tongue at one end for closing and releasing said lever from said slide plate, said loop being a spring wire element adapted to provide a spring tension so that the locking lever closes and releases with a detent action.

References Cited in the file of this patent

UNITED STATES PATENTS

| | | |
|---|---|---|
| 2,456,544 | Varner | Dec. 14, 1948 |
| 2,638,140 | Paulsen | May 12, 1953 |
| 2,767,761 | O'Higgins | Oct. 23, 1956 |